United States Patent
Spitzer et al.

(10) Patent No.: US 6,888,925 B2
(45) Date of Patent: May 3, 2005

(54) METHOD FOR TESTING LARGE-SCALE AUDIO CONFERENCE SERVERS

(75) Inventors: Andy Spitzer, North Andover, MA (US); Rongrong Wu, Acton, MA (US)

(73) Assignee: Snowshore Networks, Inc., Chelmsford, MA (US)

( * ) Notice: Subject to any disclaimer, the term of this patent is extended or adjusted under 35 U.S.C. 154(b) by 608 days.

(21) Appl. No.: 10/003,512

(22) Filed: Oct. 26, 2001

(65) Prior Publication Data

US 2003/0083059 A1 May 1, 2003

(51) Int. Cl.[7] .............................................. H04M 1/24
(52) U.S. Cl. ................................. 379/15.01; 379/1.01
(58) Field of Search ........................... 455/423, 424; 379/1.01, 1.02, 2, 10.01, 10.02, 18, 22.02, 26.01, 29.02, 14.01, 15.01, 27.04, 202.01, 406.01, 386, 283

(56) References Cited

U.S. PATENT DOCUMENTS

| | | | |
|---|---|---|---|
| 4,712,231 A | * 12/1987 | Julstrom | 379/202.01 |
| 5,325,425 A | 6/1994 | Novas et al. | 379/100 |
| 5,325,427 A | * 6/1994 | Dighe | 379/386 |
| 5,521,967 A | 5/1996 | Novas et al. | 379/100 |
| 6,697,476 B1 | * 2/2004 | O'Malley et al. | 379/202.01 |
| 6,721,411 B2 | * 4/2004 | O'Malley et al. | 379/202.01 |

OTHER PUBLICATIONS

Generating DTMF Tones Using Soundcard; http://www.hut.fi/–then/mytexts/dtmf_generation.html; 2 pages.
Goertzel Algorithm; http://ptolemy.eecs.berkeley.edu/papers/96/dtmf_ict/www/node3.html; 2 pages.
Empirix Stressing Performance, Voice/Network Test; www.empirix.com; 3 pages.

* cited by examiner

*Primary Examiner*—Rexford Barnie
(74) *Attorney, Agent, or Firm*—Weingarten, Schurgin, Gagnebin & Lebovici LLP

(57) ABSTRACT

A method and apparatus for testing a conference server. A plurality of test tone signals are generated. In one embodiment each test tone signal comprises the sum of at least two distinct frequency signals. Each test tone signal is employed to simulate a participant and the test tone signals are applied to a plurality of inputs of the conference server. At least some of the test tone signals are combined by the conference server to produce a corresponding plurality of test output signals. The test output signals are analyzed to identify whether the proper test tone signals are present within the respective test output signals. The generation of test tone signals and the analysis of the conference server outputs may be automated to facilitate rapid testing of conference server functionality. An indication of the test results are generated.

15 Claims, 3 Drawing Sheets

METHOD FOR TESTING LARGE-SCALE AUDIO CONFERENCE SERVERS

CROSS REFERENCE TO RELATED APPLICATIONS

N/A.

STATEMENT REGARDING FEDERALLY SPONSORED RESEARCH OR DEVELOPMENT

N/A.

BACKGROUND OF THE INVENTION

The present invention relates to telecommunications systems and more specifically to a method and system for testing an audio conference server.

Audio conference servers are known in the art. Such devices allow three or more participants to participate in a real-time conference. A conference server is generally operative to mix audio signals received from a number of conference call participants and to provide audio output signals that are audible by all participants. The conference server typically includes management capabilities to manage the addition and deletion of participants to and from a conference as they join and leave the conference respectively. Inputs to the conference server may include audio from analog telephony, digital telephony, packet telephony, streaming media, or audio from other input sources.

Due to the unique features of conference servers, testing of such devices can be problematic. In particular, signaling tones used in the telephone network are comprised of the sum of specific frequency signals. Each keypad generated tone, known as a DTMF tone is the sum of two of the following frequencies; 697 Hz, 770 Hz, 882 Hz, 941 Hz, 1209 Hz, 1336 Hz, 1477 Hz, 1633 Hz. The DTMF signaling tones that are used in telephones for tone dialing are typically removed by conference servers. Additionally, conference servers typically detect and remove strong single frequency tones from a conference in order to avoid feedback squeal.

It would be desirable to have an effective method and system for testing conference servers that may be automated and that can accommodate a large number of simulated conference participants.

BRIEF SUMMARY OF THE INVENTION

A method and system for testing audio conference servers is disclosed. To determine if the audio from many legs of a conference is being combined properly by the conference server, distinct test tones are transmitted to the conference server over input legs of a plurality of full duplex channels between simulated conference participants and the conference server. The test tones are employed to simulate respective conference participants. For each input leg of a full duplex channel the conference server generates an output signal that is returned to the respective participant over an output leg of the full duplex channel as described below. A predetermined number of participants are selected as active participants. The selected active participants are typically the participants that have the highest volume component of all the participants within the conference. The output signal corresponding to a given input leg for a selected active participant includes the test tones associated with each of the active participants but does not include the test tone that is injected into the respective input leg. In addition to the outputs associated with each input leg, the conference server produces a global output signal that is comprised of the sum of the test tones from all of the selected active participants. The global output signal comprises an output signal that is returned to each of the non-selected participants. The test tones within output signals directed to each of the simulated participants are analyzed to determine if the conference server is functioning properly. Such analysis may be performed on an automated basis to provide a high quality test that may be rapidly performed.

More specifically, each leg of the conference is assigned a distinct test tone that includes two frequencies in one embodiment. The test tones that are selected are preferably not DTMF tones and thus, are not removed by conference servers that filter out DTMF tones. Since multiple frequencies are employed for the distinct tones delivered over each leg to the conference server, the typical filters included within conference servers do not remove these tones from the conference server output. The analysis of the conference server outputs, in a preferred embodiment, is performed using a fast discrete courier transform (DFT) based algorithm, such as the well known "Goertzel" algorithm to ascertain which test tones are present in which outputs. This information is employed to verify that the conference server is functioning properly.

The signals transmitted over each leg may comprise alternating test tone portions in which each test tone portion is comprised of two or more distinct frequencies to provide a greater number of test tones when testing a conference server that handles large numbers of participants.

Other features, aspects and advantages of the present invention will be apparent from the following Detailed Description of the invention and the Drawing that follows.

BRIEF DESCRIPTION OF THE SEVERAL VIEWS OF THE DRAWING

The invention will be more fully understood by reference to the following Detailed Description of the invention in conjunction with the Drawing of which.

DETAILED DESCRIPTION OF THE INVENTION

In accordance with the present invention a method and system for testing conventional conference servers are disclosed. In order to determine if the conference server is combining audio from many legs of a conference to produce the proper output signals, a method and system are provided in which distinct test tones, or alternating test tones, are sent over each input leg of a plurality of full duplex channels between simulated conference participants and the conference server. The test tones are employed to simulate audio conference participants on the respective legs or channels of a conference. The conference server combines the test tones in a predetermined manner and conveys the combined test tones to the respective conference participants over output legs of the full duplex channels. The conference server output channels are analyzed to determine which tones are present in each channel in order to verify the conference server operation. Optionally, the amplitude of each channel may also be determined.

Figure 1:
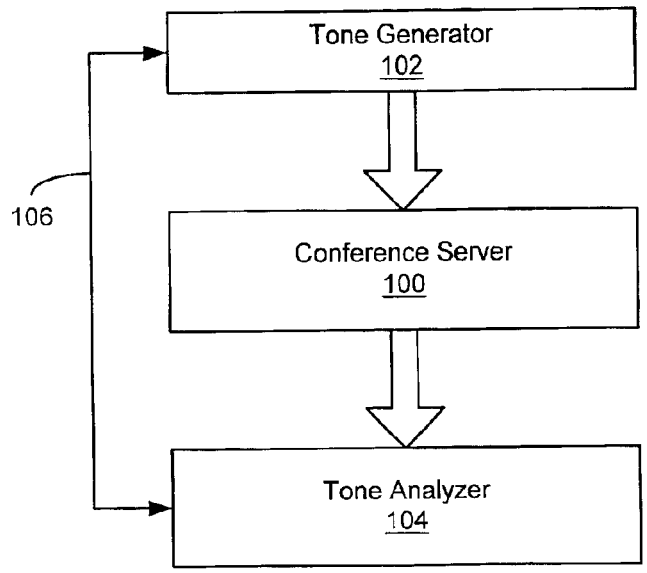
FIG. 1 is a block diagram of a system for testing a conference server in a manner consistent with the present invention.
Figure 2:
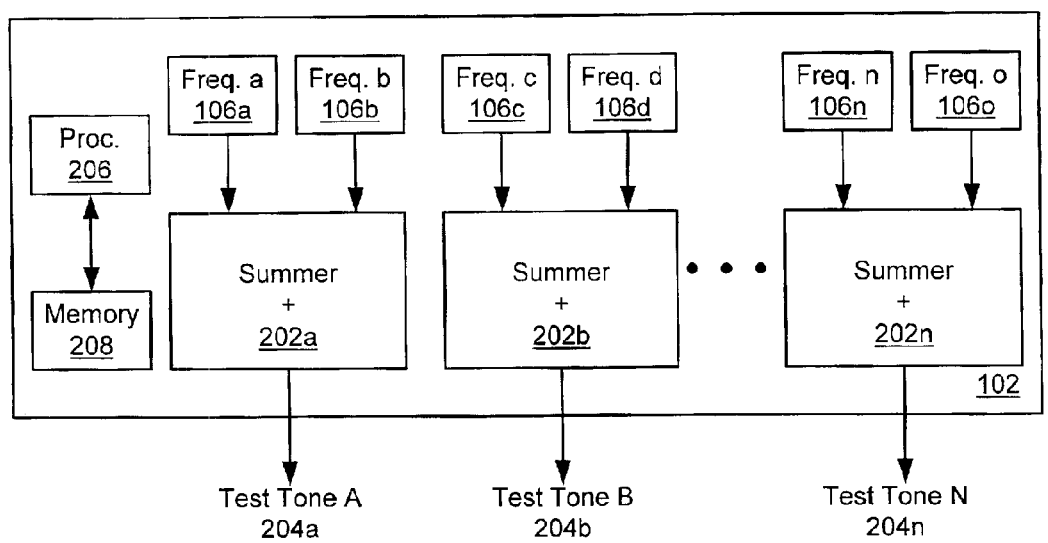
FIG. 2 is a block diagram of an exemplary tone generator for use in the conference server test system depicted in FIG. 1.

Referring to FIG. 1 the system includes a conference server 100 that represents the conference server under test, a tone generator 102, and a tone analyzer 104. In accordance with one embodiment of the presently disclosed technique, unique test tones comprising distinct frequency pairs are generated within the tone generator 102 as depicted in FIG. 2. More specifically, referring to FIG. 2, a plurality of summers 202a through 202n are provided. It should be noted that the summers 202a through 202n may comprise a software routine for combining the frequency components, an active circuit or alternatively a summing junction. In one embodiment, two non-DTMF frequency signals are provided to each summer 202a–202n by signal generators identified as Freq. a 106a–Freq. o 106o to generate the test tone signals designated Tone A 204a through Tone N 204n. More specifically, in the illustrative embodiment, non-DTMF frequency A 106a and frequency B are summed by summer 202a to produce test tone A 204a, non-DTMF frequencies C 106c and frequency D are summed by summer 202b to produce test tone B 204b, etc. The test tones 204a to 204n are coupled to different conference server input legs or channels and are thus conveyed to the conference server 100. The test tones are combined within the conference server 100 in accordance with commands issued to the conference server 100 and the conference server 100 generates a test output signal for each received input leg. The channels between the conference participant and the conference server 100 are full duplex channels and the test output signal that is generated for each input leg is returned over the output or return leg of the full duplex channel.

Figure 3:
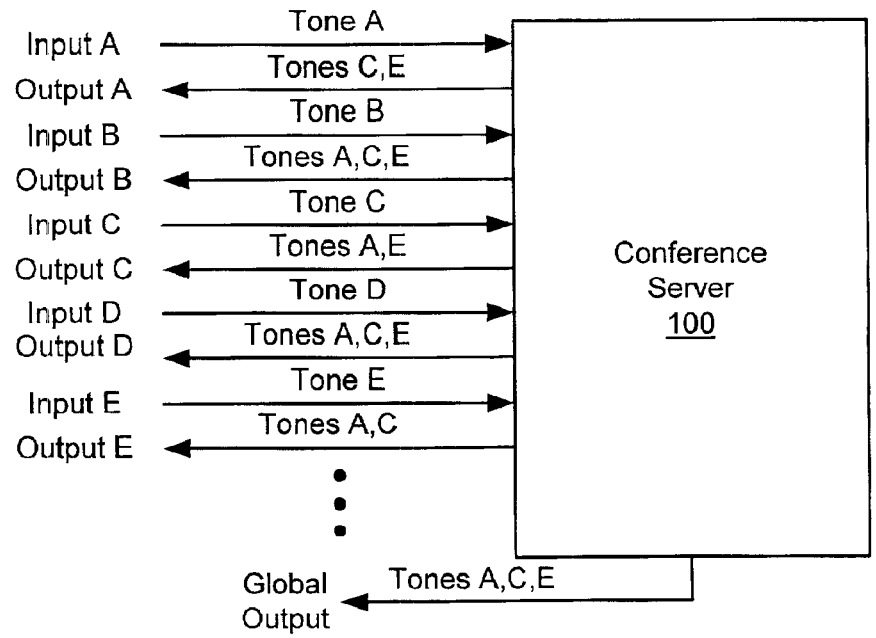
FIG. 3 is a block diagram of a conference server illustrating the presently disclosed test technique.

The operation of the presently disclosed test system will be further apparent by reference to FIG. 3. FIG. 3 depicts an illustrative conference server 100 having five full duplex channels. Channel A includes an input A for conveying a signal to the conference server from the first conference participant and an output A for conveying a signal from the conference server 100 to the first conference participant. Channel B includes an input B for conveying a signal to the conference server 100 to the second conference participant and an output B for conveying a signal from the conference server 100 to the second conference participant. Depicted channels C, D, and E have similar inputs and outputs. Any number of additional channels may be provided.

In the presently disclosed system, the conference server 100 selects a predetermined number of conference participants as the selected active conference participants. The presently disclosed conference server makes this selection based upon the volume level of the respective participants and selects as the active participants, the three participants that have the largest volume.

The output signal for each channel that involves a selected participant comprises the sum of the other selected participants but does not include the input signal for the respective channel. By excluding the input signal from the output signal for a selected channel, the conference participant does not hear himself talking. The exclusion of the participant from the returned output signal avoids confusion as the output signal may be slightly delayed from the input signal.

For purposes of explanation, assume that a conference includes 5 channels (A, B, C, D and E). In accordance with the presently disclosed test technique, test tone A 104a is applied to input A of conference server 100, test tone B 204b is applied to input B of conference server 100, test tone C is applied to input C of conference server 100, test tone D is applied to input D of conference server 100 and test tone E is applied to input E of conference server 100. Assuming that test tones A, C and E are the highest volume inputs and that the conference server 100 selects the three largest volume inputs as the active inputs, inputs A, C and E are selected as the active conference server 100 inputs. Thus, the output signal for the three selected channels comprises the test tones for the selected channels but excludes the test tone on the input of the respective channel. Thus, the output generated for channel A would comprise the sum of test tone C and test tone E, the output generated for channel C would comprise the sum of test tone A and test tone E and the output generated for channel E would comprise the sum of test tone A and test tone C.

The conference server also generates a global output that comprises the sum of the test tones on all of the selected channels. Once again, assuming test tones A, C and E on inputs A, C and E are selected, the global output from the conference server 100 would comprise the sum of test tones A, C and E. The global output is conveyed to the participants on the output leg of channels having non-selected inputs (i.e. channels for which the inputs are not one of a predetermined number of largest volume inputs). Thus, in the illustrative example presently described, the global output is conveyed over the output legs of the full duplex channels B and D.

The test output signals from the conference server 100 are analyzed in real time or alternatively, are recorded and later analyzed using any suitable spectral analysis tools that can identify the frequency components within the respective test tones. In the illustrated embodiment, the conference server 100 output signals are analyzed using a fast DFT algorithm as discussed below. By determining which tones are present in the respective output signals, a determination may be made as to which channels are considered "talkers" and are thus added to the conference, and which are not and that the proper test tones received as input are being conveyed over the proper conference server 100 outputs.

An exemplary tone generation/detection technique suitable for use in the present system is described with greater particularity below.

The Tone A 204a–Tone N 204n signals applied to the input channels of the conference server 100 are comprised of two distinct frequencies. In one embodiment, the specific frequencies that are selected are not frequencies used in the DTMF tone matrix. Thus, the conference server employs a first set of tones for alphanumeric signaling and a second set of tones for test purposes.

Exemplary tone definitions used for testing six channels of a conference server the are set forth below:
"tone A": 300 Hz+550 Hz
"tone B": 800 Hz+1050 Hz
"tone C": 1300 Hz+1550 Hz
"tone D": 2300 Hz+2550 Hz
"tone E": 3050 Hz+3300 Hz
"tone A": 3550 Hz+3800 Hz.

Although in the illustrative embodiment, the test tones include two frequency components, the test tones may have three or more frequency components. The test tones are selected so they may be distinguished when mixed with one or more other test tones. To allow the test tones to be easily distinguished in one embodiment, preferably, none of the frequencies 106a through 106o are the same.

Each frequency used to make up the various test tones is separated from other frequencies used to make up the test tones by a minimum amount in order to be able to distinguish between them. In the illustrated embodiment a spacing of at least approximately 100 Hz is provided between any two adjacent frequencies used to make up the test tones. This spacing, combined with the 4000 Hz bandwidth of the telephone network (8000 samples/second yields 4000 Hz bandwidth) limits this technique to about 200 unique tones. If a greater number of test tones are needed to test large-scale conference servers, then alternate methods may be employed. For example, more than 2 frequencies may be employed to make up each individual test tone. Alternatively, alternating tones may be defined in which a periodic alternating tone is provided that includes first and second test tone portions. The first test tone portion extends for a first predetermined period and the second test tone portion extends for a second predetermined period following the first test tone period. The sequence repeats continuously during testing in a periodic sequence. For example:

"tone A": 300 Hz+400 Hz for 1 second, followed by 400 Hz

500 Hz for 1 second. Repeat. . .

"tone B": 400 Hz+500 Hz for 2 seconds, followed by 500 Hz+

600 Hz for 2 seconds. Repeat.

Detection of the respective simulated participants using alternating test tones includes an identification of the respective test tones portions. Via this technique a greater number of test tones may be provided to permit testing of a conference servers supporting a large number of input channels.

Figure 4:
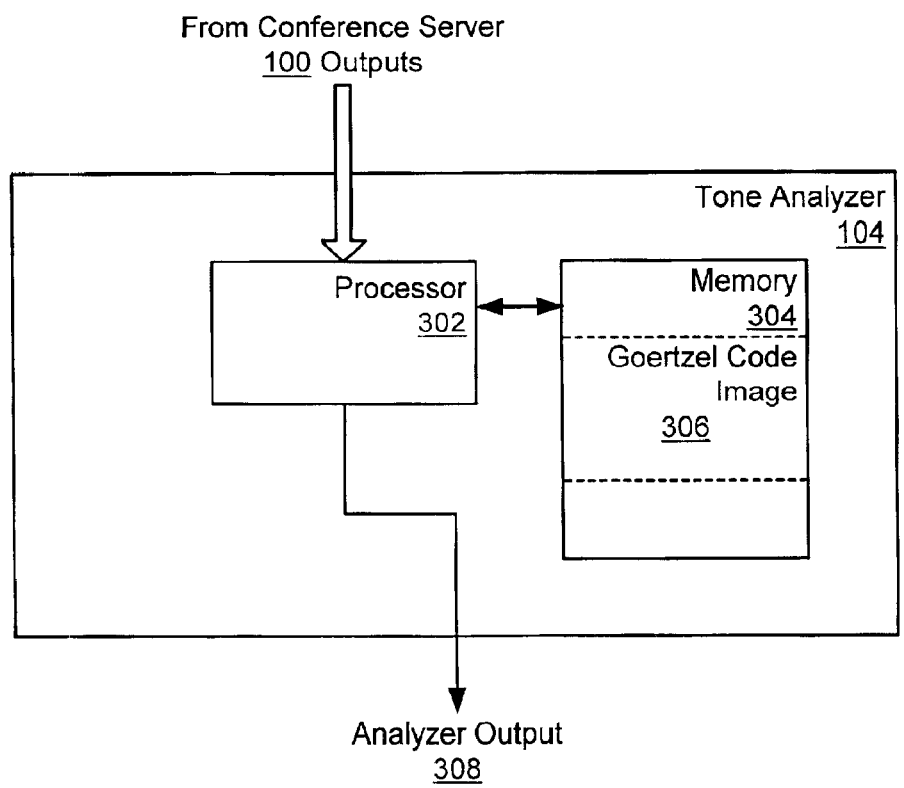
FIG. 4 is a block diagram of a tone analyzer for use in the conference server test system depicted in FIG. 1.

The tone analyzer 104 depicted in FIG. 1 is illustrated in greater detail in FIG. 4. The test tones may be detected within the conference server 100 output signals using a well-known algorithm. For example, a fast-Discrete Fourier Transform (DFT) based algorithm, such as the "Goertzel" algorithm may be employed. As depicted in FIG. 4 the Tone Analyzer 104 includes a processor 302 and a memory 304. The processor 302 is operative to execute the Goertzel algorithm stored as a code image 306 within the memory 304 to determine the specific test tones that are included within the conference server 100 output signals. Alternatively, the Goertzel algorithm may be executed out of a hard wired or programmed controller. The tone generator 102 and the tone analyzer 104 may be communicably coupled or in communication with a processor to facilitate automated testing of the conference server 100. In particular, under processor control the test tones may be applied to specific inputs of the conference server 100 and the tone analyzer 104 may be instructed to monitor the conference server 100 outputs in a specified sequence. Furthermore, multiple tone analyzers may be employed to facilitate parallel and more rapid test tone discrimination.

Following the identification of the test tones present in the conference server 100 output signals, the tone analyzer 104 may generate analyzer output signals 308 that provide an indication of the tones included within the conference server output signals and/or an indication of whether the conference server 100 functionality under test is working properly.

Use of the special tones presently described allows various conference server functions to be tested. For example, if 3 defined "talkers" are present on a conference, other participants may be listening. Using "tone A" to simulate "talker-1", "tone B" to simulate "talker-2", and "tone C" to simulate "talker 3" the outputs may be analyzed for one or more listeners to determine whether they received the various tones representing "talker-1" "talker-2" and "talker-3".

In the event one or more of the tones are not detected as being present in one or more of the conference server 100 output signals when expected to be present, such is indicative of a problem with the conference server 100. Similarly, if a test tone is detected when it is not expected to be present such is indicative of a problem with the conference server 100.

Additionally, the special tones may be employed to perform a conference mute function test. By way of example, if three conference participants are being simulated, a first test tone may be applied to a first input channel of the conference server, a second test tone may be applied to a second input channel of the conference server and a third test tone may be applied to a third input channel of the conference server. To test the mute function, test tones may be applied to all input channels to verify that in the absence of the mute command, the respective test tones are included within the conference server output signals. A mute command is then transmitted to the conference server so that other participants in the simulated conference cannot hear the muted participant. Assuming that a mute command is forwarded to the conference server to mute the first test tone, the conference server output signal should not include the first test tone. To verify the functionality of the mute function, the conference server output signals may be analyzed using a fast DFT, as described above, to identify which test tones are present. In the above example, in the event the first test tone is absent from the conference server output signals and the second and third test tones are present in the conference server output signals following the assertion of the mute command, such is indicative that the mute function is working properly.

Moreover, the special tones may be employed in a conference gain-control function test. When conference gain-control is invoked, the "Goertzel" algorithm can be used to analyze the audio gain amplitudes. The output of the Goertzel filter is an indication of the power level of a particular frequency in the input signal. If positive gain is applied to the conference output, then the "Goertzel" filter should register a more powerful level of all the frequencies. If positive gain is applied to one of the input legs only, then the power level of the frequencies from that leg should be correspondingly larger in the mixed output, with the power level of the other tones remaining relatively the same.

Figure 5:
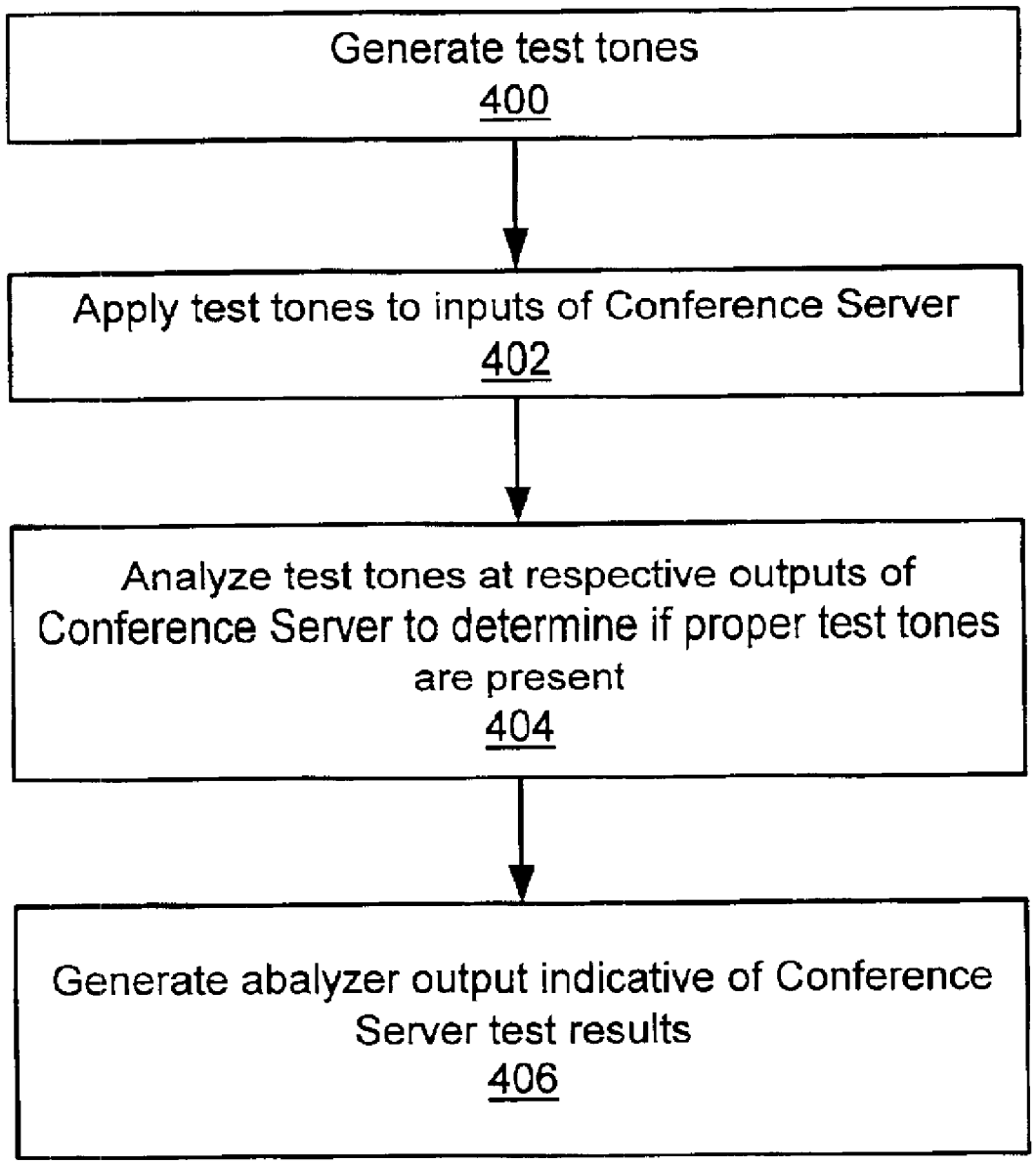
FIG. 5 is a flow diagram depicting the presently disclosed method for testing a conference server.

The above-described test system and method is further illustrated by reference to the flow diagram of FIG. 5. As illustrated at step 400 the test tones are generated via the tone generator 102 (FIG. 1). The test tones are applied to the inputs of the conference server 100 under test as illustrated in step 402. The tone analyzer 104 is employed to determine the test tones present in each of the relevant conference server 100 outputs and to assess whether the proper test tones are present in each of the conference server 100 outputs depicted in step 404. Finally, an indication of whether the conference server 100 is functioning properly is provided as illustrated at step 406.

Moreover, as discussed above, the presently disclosed test method may be automated so that that the testing of large conference servers may be performed in a reliable and time efficient manner. More specifically, the test tones may be automatically applied to the conference server inputs under the control of a first processor 206 (FIG. 2) executing a control program out of a memory 208 (FIG. 2) employed for tone generation and the outputs automatically analyzed and monitored under the control of a second processor 308 executing of a memory 306 associated with the tone analyzer 104. Additionally, the test tone amplitudes may be varied on an automated basis so that the selected inputs are varied during automated testing of the conference server. In a system in which separate processors (206 and 302) are employed for control of the tone generator 102 and the tone analyzer 104, the two processors are communicably coupled via signal path 106 (FIG. 1) to allow synchronization of test functions. Moreover, it should be recognized that control of the tone generator 102 and the tone analyzer 104 may be integrated and performed by a single processor.

It should be noted that in the event that the conference server 100 does not employ DTMF tone filtering, the present test method may employ DTMF tones for test tone inputs to the conference server 100. It should also be noted that in the event that the conference server does not employ single frequency filtering, single frequency test tones may be employed as inputs to the conference server 100 under test.

It will be apparent to those of ordinary skill in the art that variations to and modifications of the above-described method and system may be made without departing from the inventive concepts described herein. Accordingly, the invention should not be viewed as limited except as by the scope and spirit of the appended claims.

What is claimed is:

1. A method for testing a conference server for use in a telephone network, said conference server having a plurality full duplex channels, each channel including an input to the conference server and an output from the server, said method comprising the steps of:
   in a first generating step, generating a plurality of unique test tone signals;
   applying a different one of said plurality of test tone signals to each one of said plurality of conference server inputs;
   selectively combining at least some of said test tone signals within said conference server to generate a plurality of test output signals corresponding in number to said conference server inputs and coupling said test output signals to selected ones of said conference server outputs;
   analyzing said conference server outputs to identify which of said plurality of test tone signals are present within said conference server outputs; and
   providing an error indication in the event at least one of said test tone signals detected within said conference server outputs does not correspond to a corresponding expected test tone signal.

2. The method of claim 1 wherein at least one of said test tone signals comprises at least two unique audio frequency signals.

3. The method of claim 1 wherein said audio frequency signals comprise audio frequency signals that are not employed within said telephone network for alphanumeric character signaling.

4. The method of claim 1 wherein said applying step includes the step of applying a different one of said plurality of test tone signals to each one of said plurality of conference server inputs under the control of a first processor.

5. The method of claim 4 wherein said analyzing step is performed under the control of a second processor.

6. The method of claim 3 wherein said first and second processors comprise the same processor.

7. The method of claim 1 wherein said first generating step includes the step of generating n test tone signals, said analyzing step comprises the step of analyzing said conference server outputs to identify which of said n test tone signals are present within said outputs, and said analyzing step comprises the step of generating a tone analyzer output signal for each of said conference server outputs that indicates if selected ones of said n test tone signals are absent from the respective conference server output.

8. The method of claim 7 wherein said analyzing step includes the step of utilizing a controller that is operative to execute a Goertzel algorithm to identify which of said n test tone signals are present within said conference server outputs.

9. The method of claim 1 wherein said first generating step includes the step of generating n test tone signals and said method further includes the step of transmitting a control signal to said conference server to mute one of said n test tone signals; in a second generating step, generating an output that is indicative of the presence of said one of said n test tone signals within at least one of said conference server outputs.

10. The method of claim 9 wherein said analyzing step includes the step of utilizing a controller that is operative to execute a Goertzel algorithm to identify which of said n test tone signals are present within said test output signal.

11. The method of claim 1 wherein said method includes the step of recording said conference server outputs; and
   said analyzing step comprises the step of analyzing said recorded conference server outputs.

12. The method of claim 1 wherein said first generating step comprises the step of generating a plurality of test tone signals having at least first and second test tone signal portions, wherein each of said first and second test tone signal portions comprises the sum of at least two distinct audio frequency signals and wherein said first test tone signal portion is not the same as said second test tone signal portion.

13. The method of claim 12 wherein said first and second test tone signal portions repeat on a generally periodic basis.

14. The method of claim 1 wherein each of said audio frequency signals are separated from all other audio frequency signals employed to generate said test tone signals by at least one-hundred hertz.

15. The method of claim 1 further including the steps of:
   providing gain control commands to said conference server to vary the gain of said conference server with respect to at least one of said test tone signals;
   wherein said analyzing step includes the step of analyzing the gain of said at least one test tone signal within said conference server output signals to determine whether the amplitude of said at least one test tone signal varies in accordance with said gain control commands; and
   in a second generating step, generating an indication of the variation of the gain for said at least one test tone signal in response to said gain control commands.

* * * * *

UNITED STATES PATENT AND TRADEMARK OFFICE
CERTIFICATE OF CORRECTION

PATENT NO.    : 6,888,925 B2
DATED         : May 3, 2005
INVENTOR(S)   : Andy Spitzer et al.

It is certified that error appears in the above-identified patent and that said Letters Patent is hereby corrected as shown below:

Column 4,
Line 60, ""tone A"" should read -- "tone F" --.

Column 5,
Line 22, "Hz" should read -- Hz + --.

Signed and Sealed this

Thirty-first Day of January, 2006

JON W. DUDAS
*Director of the United States Patent and Trademark Office*